United States Patent [19]

Pampouchidis et al.

[11] 4,176,099
[45] Nov. 27, 1979

[54] SELF-CROSSLINKING CATIONIC RESIN EMULSIONS FOR USE IN ELECTRODEPOSITION PAINTS

[75] Inventors: Georgios Pampouchidis; Helmut Hönig, both of Graz, Austria

[73] Assignee: Vianova Kunstharz, A.G., Vienna, Austria

[21] Appl. No.: 874,562

[22] Filed: Feb. 2, 1978

[30] Foreign Application Priority Data

Feb. 7, 1977 [AT] Austria ................................ 756/77

[51] Int. Cl.² ............................................... C08L 33/21
[52] U.S. Cl. ........................ 260/18 TN; 260/29.2 TN; 260/29.6 NR; 528/49; 528/75
[58] Field of Search ................................... 528/75, 49; 260/29.6 NR, 29.2 TN, 18 TN

[56] References Cited

U.S. PATENT DOCUMENTS

| | | | |
|---|---|---|---|
| 3,907,751 | 9/1975 | Knight et al. | 528/75 |
| 3,907,865 | 9/1975 | Miyata et al. | 528/75 |

*Primary Examiner*—Maurice J. Welsh
*Attorney, Agent, or Firm*—A. W. Breiner

[57] ABSTRACT

Aqueous emulsions of binders for cathodically depositable aqueous coating compositions comprising emulsions of 10 to 99.9 percent by weight of a self-crosslinking polycondensation resin or polymerization resin, and 0.1 to 90 percent by weight of one or more basic urethane component which is the reaction product of (A) 1 mole of polyisocyanate with (B) at least 1 mole dialkylalkanolamine and a monohydroxyalkyl(meth)acrylate and/or a monohydroxyalkoxy(meth)acrylate and/or a monohydroxyallylether of a polyol. Component (B) whch optionally can include a saturated and/or unsaturated fatty alcohol or fatty acid will have an NCO-value of substantially zero. The basic content of the emulsion is at least 0.5, and the double bond number is at least 0.5. The emulsions have excellent stability without use of additional emulsifiers and films obtained from coating compositions containing the emulsions have good adhesion characteristics, cure at relatively low temperatures and relatively short curing times to provide films having excellent resistance to water, chemicals, and corrosion.

14 Claims, No Drawings

SELF-CROSSLINKING CATIONIC RESIN EMULSIONS FOR USE IN ELECTRODEPOSITION PAINTS

The present invention is directed to binders for protective coatings depositable by electrodeposition. More particularly, it is directed to binders and to a process for producing binders which are self-crosslinking cationic emulsions depositable by electrodeposition.

Copending applications assigned to the assignee of the present invention describe self-crosslinking binders for cathodic deposition according to the electrodeposition process which carries unsaturated groups as well as basic nitrogen atoms. The products described in the aforesaid applications in general provide films with satisfactory performance, particularly with regard to chemical and physical properties. However, such products at times exhibit poor leveling of the deposited films on certain substrates as well as providing inadequate adhesion, particularly to untreated steel.

Surprisingly it has now been found that the poor leveling and inadequate adhesion as above noted are overcome, enabling the preparation of cathodically depositable binders for electrodeposition which excel in application characteristics as well as with respect to the quality of the deposited and crosslinked coatings over products known in the art up to now by providing polycondensation products or polymerization products, including polyaddition products, optionally carrying basic groups and/or polymerizable double bonds which are emulsified in water with the aid of special urethane components and upon partial or total neutralization of the basic groups with inorganic and/or organic acids. The urethane components have basic nitrogen groups and optionally crosslinkable double bonds.

According to the present invention, 10 to 99.9% by weight of one or more polycondensation resins, or polymerization resins including polyaddition resins optionally being self-crosslinking and/or carrying basic groups, and 0.1 to 90% by weight of one or more basic urethane compounds, optionally carrying alpha, beta-positioned double bonds, of the general formula

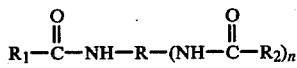

wherein n is an integer of 1, 2, or 3; R is an aromatic, cycloaliphatic, or aliphatic hydrocarbon radical; $R_1$ is the moiety of a dialkylalkanol amine remaining free after reaction with an isocyanate; and $R_2$ is the moiety of a monohydroxyalkyl(meth)acrylate and/or a monohydroxyalkoxy(meth)acrylate and/or a monohydroxyallylether of a polyol and/or unsaturated fatty alcohol with at least 6 carbon atoms and/or of an unsaturated fatty acid with at least 6 carbon atoms and/or of a saturated monoalcohol with from 1 to 24 carbon atoms and/or of a saturated monocarboxylic acid with from 2 to 24 carbon atoms, and, in case n is more than 1, $R_2$ in addition to at least one of the moieties mentioned for $R_2$ can be a moiety as defined in $R_1$, are emulsified in water, optionally after mixing or milling together with pigments, extenders, and known additives, and upon partial or total neutralization of the basic groupings of the system with inorganic or organic acids, the type and weight ratios of the resin components being chosen such that the system has a basicity corresponding to at least 0.5, preferably from 0.8 to 2.5 basic nitrogen atoms for 1000 molecular weight units and a number of double linkages, or a double bond number of at least 0.5. "Double bond number" as used herein is the number of chain end and side chain double bonds in 1000 molecular weight units.

Surprisingly, the emulsions prepared by the above process exhibit excellent stability without the use of other emulsifiers even when used in substantially diluted form as normally required for electrodeposition baths. The urethane component influences the viscosity curve as well as the curing characteristics of the deposited films and in a sense guarantees the formation of high quality film surfaces as well as leading to a substantial improvement in adhesion of the deposited films, even to steel substrates. The improvements further enhance corrosion resistance. Furthermore, the addition of the urethane component permits regulation of the deposition equivalent, in turn influencing the build-up of the film.

In one modification of the process of this invention, 90 to 99.9% by weight, preferably from 95 to 99.5% by weight of a self-crosslinking polycondensation resin, or polymerization resin including a polyaddition resin carrying in its structure at least 0.5 basic nitrogen atoms per 1000 molecular weight units and a double bond number of at least 0.5, and 0.1 to 10% by weight, preferably 6.5 to 5% by weight of one or more of the above-noted urethane compounds, are emulsified in water upon partial or total neutralization of the basic groups of the system with inorganic and/or organic acids, optionally after blending or milling with pigments, extenders, and known additives.

In such modification, the urethane compound on the one hand serves as leveling agent to improve the quality of the film surface and its adhesion to diverse substrates; and, on the other hand, permits adjusting and regulating the pH-value and the conductivity of the bath material. By changing the basicity of the systems, the pH-value of the bath can be adjusted to select conditions for achieving optimum coating performance.

In another modification of the process of this invention, 10 to 90% by weight, preferably 20 to 80% by weight of one or more self-crosslinking polycondensation or polymerization resins including a polyaddition resin, having a double bond number of at least 0.5 and carrying no basic groups, and 90 to 10% by weight, preferably 80 to 20% by weight of one or more of the above-noted urethane compounds, are emulsified in water, upon partial or total neutralization of the basic groups with inorganic and/or organic acids, optionally upon blending or milling with pigments, extenders, and normal additives, the weight ratios being chosen such that for the system a basicity corresponding to at 0.5, preferably 0.8 to 1.5 basic nitrogen atoms in 1000 molecular weight units and a double bond number of at least 0.5 is obtained. With such modification self-crosslinking systems which can be crosslinked, e.g., through thermal polymerization of the double bonds, are emulsified in water with the aid of the urethane compounds, the system attaining the basicity relevant for electrodeposition at the cathode through the emulsifier.

In still another modification of the process of this invention, 10 to 90% by weight, preferably 20 to 80% by weight of one or more polycondensation resins or polymerization resins including polyaddition resins carrying at least 0.5, preferably 0.8 to 2.5 basic nitrogen atoms in 1000 molecular weight units and per se having an insufficient hardening capacity, and 90 to 10% by weight, preferably 80 to 20% by weight of one or more of the above-mentioned urethane compounds are emulsified in water upon partial or total neutralization of the basic groupings with inorganic and/or organic acids upon optional blending or milling with pigments, extenders and normal additives, the weight ratios being chosen such that the system has a double bond number of at least 0.5, preferably 1.0 to 4.

With such modification, the double bonds necessary for obtaining satisfactory crosslinking are introduced through the urethane compound.

It is apparent that combinations of various starting resins can be emulsified with the urethane compounds, emulsification or curing capacity being influenced as desired through selection of suitable components.

The polycondensation or polymerization resins suitable for the process of the invention are self-crosslinking binders for cathodic deposition carrying unsaturated groups as well as basic nitrogen groups. These binders include (A) the reaction products of diepoxy compounds with alpha, beta-unsaturated acids and, optionally, long chain fatty acids, and basic monoisocyanates as described in copending application Ser. No. 816,936 filed July 19, 1977, assigned to the assignee of the present application;

(B) reaction products of diepoxy compounds, which optionally include fatty acids, with monoamines and unsaturated monoisocyanates as described in copending application Ser. No. 816,937 filed July 19, 1977, assigned to the assignee of the present application; and (C) two moles of a diepoxy compound plus one mole of a primary-tertiary or secondary-secondary diamine plus two moles of an alpha, beta-unsaturated monocarboxylic acid and, optionally, an unsaturated fatty acid, plus an unsaturated monoisocyanate as described in copending application Ser. No. 849,265 filed Nov. 7, 1977, assigned to the assignee of the present application. The aforesaid binders are highly desirable due to their ability to self-crosslink through the presence of alpha, beta-unsaturation; their being watersoluble in the presence of acids due to the basic nitrogen atoms, and their ability to provide excellent films with good performance characteristics, particularly regarding resistance to corroding influences. Moreover, the urethane compounds of the present application enhance the characteristics of other binders which are deposited by cathodic deposition including polycondensation resins such as polyesters or aminoaldehyde condensation products; polymerization products such as copolymers of acrylic monomers and, optionally, other monomers; maleic acid addition products to dienehomo or copolymers, and polyaddition products obtained by modification of epoxy compounds with opening of the oxirane ring. Table 1 gives an exemplary list of the preferred resins for use in the present invention, setting forth their composition.

TABLE 1

| GROUPS | Starting Compound | | Modifying Substance (moles) | | | | | | |
|---|---|---|---|---|---|---|---|---|---|
| | Quantity | Type | FS | MCS | DAA | ACOH | ACG | BMI | UMI |
| A | 1 Mol | diepoxide | 0-1 | 2-1 | — | — | — | 1-2 | — |
| A | 1 Mol | diepoxide | 0-1 | — | 2-1 | — | — | — | 1-2 |
| A | 1000 g | COP | — | 2 | — | — | — | 1-2 | — |
| A | 2 Mol | diepoxide | 0-2 | 2-0 | — | — | — | — | 0-2 |
| | 1 Mol | PTD/SSD | | | | | | | |
| A | 1000 g | polyester | — | — | — | — | — | 1-2 | 1-2 |
| A | 1000 g | PD-A | — | — | 2 | 2 | 2 | — | — |
| B | 1 Mol | diepoxide | 0-1 | 2-1 | — | — | — | — | — |
| B | 1000 g | polyester | — | — | — | — | — | — | 1-4 |
| B | 1000 g | PD-A | — | — | — | 2 | 2 | — | — |
| B | 1 Mol | HMMM | — | — | — | 3 | — | — | — |
| B | 1000 g | COP | — | 2 | — | — | — | — | — |
| C | 1 Mol | diepoxide | 0-1 | — | 2-1 | — | — | — | — |
| C | 1000 g | COP | — | — | 2 | — | — | — | — |
| C | 2 Mol | diepoxide | 2 | — | — | — | — | — | — |
| | 1 Mol | PTD/SSD | | | | | | | |
| C | 1000 g | polyester | — | — | — | — | — | 1-3 | — |

Key to Table 1
Group A -self-crosslinking basic products
Group B -self-crosslinking products without basic character
Group C -basic products with unsatisfactory hardening capacity
FS -saturated or unsaturated fatty acids with at least 12 carbon atoms
MCS -alpha, beta-unsaturated monocarboxylic acids
DAA -secondary dialkyl- or dialkanol amine
ACOH -hydroxy(meth)acrylate
ACG -glycidyl(meth)acrylate
PTD/SSD -primary-tertiary or secondary-secondary diamine
BMI -basic monoisocyanate (prepared, for example, from diisocyanate and alkanolamine)
UMI -unsaturated isocyanate (prepared, for example, from diisocyanate and hydroxyacrylate)
Polyester -hydroxy groups containing polyester or alkyd resin with a hydroxyl number of at least 150 mg KOH/g
PD-A -maleic anhydride addition product to diene polymers, e.g., polybutadiene, -pentadiene or copolymers of such dienes (maleic acid equivalent about 500)
HMMM -hexamethoxymethylmelamine
COP -acrylic copolymers with a portion of glycidyl(meth)acrylate according to an epoxy equivalent of about 500

The urethane compounds used as emulsifiers according to the invention are compounds of the general formula

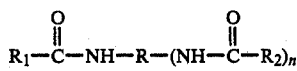

In this formula n is the integer 1, 2, or 3; R stands for an aromatic, cycloaliphatic, or aliphatic hydrocarbon radical. $R_1$ is the moiety of a dialkylalkanolamine, remaining after reaction with an isocyanate group. $R_2$ is the moiety of a monohydroxyalkyl(meth)acrylate and/or a monohydroxyalkoxy(meth)acrylate and/or a monohydroxyallyl ether of a polyol and/or unsaturated fatty alcohol with at least 6 carbon atoms and/or an unsaturated fatty acid with at least 6 carbon atoms, and/or a saturated monoalcohol with 1 to 24 carbon atoms, and/or a saturated fatty acid with 2 to 24 carbon atoms. In case n is more than 1, $R_2$ can be a radical as mentioned under $R_1$.

The urethane compounds are prepared by step-wise or simultaneous reaction of 1 mole of a suitable isocyanate with at least 1 mole of a dialkyl alkanol amine and 1 to 3 moles of a suitable saturated or unsaturated hydroxy or carboxy component at from about 20° to 80° C., optionally in the presence of isocyanate inert solvents and isocyanate reactive catalysts. Suitable polyisocyanates are the aromatic isocyanates such as 2,4- or 2,6-toluylenediisocyanate or its dimerization or trimerization products, 4,4'-diphenylmethanediisocyanate, 4,4',4"-triphenylmethanetriisocyanate, trimethylolpropane-tris-toluylene-isocyanate, tri-(4-isocyanato-phenyl)thiophosphate; cycloaliphatic isocyanates such as isophoronediisocyanate, cyclohexane-1,4-diisocyanate, dimeryldiisocyanate, or aliphatic isocyanates such as trimethylhexamethylene-1,6-diisocyanate and tris-hexamethylenetriisocyanate. Suitable dialkylalkanolamines include dimethylethanolamine, diethylethanolamine and their higher homologues or isomers. Suitable polymerizable monohydroxy compounds include hydroxyalkylesters of acrylic acid or methacrylic acid, tri- or tetra-propyleneglycolmono(meth)acrylate, trimethylolpropane-di-(meth)-acrylate, pentaerythritol-tri-(meth)acrylate, trimethylolpropanediallylether, and pentaerythritol-triallylether. The monohydroxy compound can in part be replaced with saturated or unsaturated alcohols having from 1 to 18 carbon atoms. Moreover, saturated or unsaturated monocarboxylic acids having from 2 to 18 carbon atoms can be employed. During the reaction with the carboxylic acid and the isocyanate, as is known, carbonic acid is set free. Suitable unsaturated fatty alcohols include 10-undecane-1-ol; 9 c-octadec-ene-1-ol (oleylalcohol); 9 t-octadecene-1-ol (elaidylalcohol); 9 c, 12 c-octadecadiene-1-ol (linoleylalcohol); 9 c, 12 c, 15 c-octadecatriene-1-ol (linolenylalcohol); 9 c-eicosene-1-ol (gadoleylalcohol); 13 c-docosene-1-ol (erucaalcohol); and 13 t-docosene-1-ol (brassidylalcohol). Furthermore, saturated monoalcohols with at least 6 carbon atoms can be coemployed in selected amounts to enhance leveling. These alcohols include hexanol, nonanol, decanol, and their further homologues such as dodecanol (laurylalcohol), octadecanol (stearylalcohol), etc.; and alkylalcohols such as 2-ethylhexanol, 2-pentylnonanol, 2-decyl-tetradecanol and other alcohols known as Guerbet alcohols. Among the suitable monocarboxylic acids the longer chain acids such as oleic acid, linoleic acid, linolenic acid, or other acids present in the natural oils or their modified forms are preferred. The same applies to the saturated monocarboxylic acids. Among the saturated or unsaturated monocarboxylic acids, semiesters of dicarboxylic anhydrides and monoalcohols are also suitable.

The amino groups of the binders of the invention are partially or totally neutralized with organic and/or inorganic acids such as formic acid, acetic acid, lactic acid, phosphoric acid, etc., and are then diluted with water. The degree of neutralization depends upon the characteristics of the individual binder. The preferred binder composition permits dilution or dispersion with water at a pH-value of from 4 to 9, preferably 5 to 8.

The emulsions of the invention are advantageously prepared whereby first the two components, optionally with heating, are mixed homogeneously. Blending or milling with pigments, extenders, and additives can be effected simultaneously. Then the neutralizing agent is admixed with stirring and the batch is diluted with water to the desired concentration. The concentration in water of the binder depends upon the parameters of electrodeposition and may lie in a range of between about 3 to 30% by weight and preferably from about 5 to 15% by weight. The applied coating composition may optionally contain various additives, such as pigments, extenders, surface active agents, etc.

Upon electrodeposition, the binder of the invention as a vehicle of the aqueous coating composition is wired to a conductive anode and cathode, the surface of the cathode being coated with the coating composition. The conductive substrates to be coated may be of a variety of materials, particularly of metals such as steel, aluminum, copper, etc. However, metalized materials rendered conductive through a conductive coating can be used. After deposition, the coating is cured at a stoving schedule of from about 130° to 200° C., preferably 150° to 180° C. for about 5 to 30 minutes, preferably 10 to 25 minutes.

The following examples illustrate the invention. It is to be understood, however, that the preferred examples are non-limiting in their scope. Explanation of the abbreviations used in the examples is as follows:

DBz—double bond number (number of chain end and side chain double bonds in 1000 molecular weight units)

BNz—number of basic groupings in 1000 molecular weight units

BMI (70%)—70% solution of AEGLAC of a basic monoisocyanate, prepared from 1 mole TDI and 1 mole dimethylethanol amine UMI (70%)—70% solution of AEGLAC of an unsaturated monoisocyanate prepared from 1 mole TDI and 1 mole hydroxyethylmethacrylate AEGLAC—ethylglycolacetate (monoethyleneglycolmonoethyletheracetate)

MIBK—methylisobutylketone

DMF—dimethylformamide

TDI—toluylenediisocyanate (available isomer blend)

IPDI—isophoronediisocyanate

TPMT—triphenylmethanetriisocyanate

TIPTP—tris-(4-isocyanatophenyl)-thiophosphate

DMAEA—dimethylethanolamine

HAEMA—hydroxyethylmethacrylate

TPGMMA—tripropyleneglycolmonomethacrylate

OLA—oleylalcohol

TMPDMA—trimethylolpropanedimethacrylate

STAL—stearylalcohol

OLS—oleic acid

INS—isononanoic acid

(A) Preparation of the Self-Crosslinking Products With Basic Characteristics.

(A1) In a reaction vessel equipped with stirrer, addition funnel for dropwise addition and thermometer, 1000 g of a Bisphenol A based epoxy resin having an epoxy equivalent of about 500 in 492 g AEGLAC are dissolved at 60° to 70° C. 0.2 g hydroquinone and 144 g of acrylic acid are added and the temperature is raised to 100° to 110° C. At the stated temperature the reaction is carried to an acid value of below 5 mg KOH/g (DBz=1.75). Then, at 60° to 70° C., the reaction product is mixed with 652 g BMI (70%) and reacted to an NCO-value of substantially 0 (DBz=1.25, BNz=1.1).

(A2) 520 g of a Bisphenol A based epoxy resin having an epoxy equivalent of about 260 are dissolved in 465 g AEGLAC and reacted according to the procedure of (A1) with 564 g of a semiester of tetrahydrophthalic anhydride and hydroxyethylmethacrylate (DBz=1.85). The reaction product is further reacted with 750 g of BMI (70%) as in (A1) (DBz=1.24, BNz=1.24).

(A3) 1000 g of an epoxy resin (epoxy equivalent about 500) is reacted as in (A1) with 86.5 g acrylic acid and 224 g dehydrated castor oil fatty acid and, subsequently, with 652 g BMI (70%) (DBz=0.68, BNz=0.99).

(A4) To a solution of 1000 g of a Bisphenol A based epoxy resin having an epoxy equivalent of about 500 in 520 g AEGLAC, 210 g of diethanol amine are added dropwise within an hour at a temperature of about 100° to 110° C. The batch is thereafter heated to 150° C. and reacted for another hour. Subsequently, the reaction product is reacted at 60° to 70° C. with 652 g UMI (70%) to an NCO-value of practically 0 (DBz=0.90, BNz=1.20).

(A5) A copolymer is prepared in known manner from 180 g acrylic acid, 120 g ethylacrylate, 250 g methylmethacrylate, 250 g n-butylacrylate, 250 g styrol, 695 g AEGLAC, in the presence of 20 g azodiisobutyronitrile and tert.dodecylmercaptan, at 100° to 105° C. Upon addition of hydroquinone, the copolymer is reacted with 355 g glycidyl methacrylate to an acid value of below 5 mg KOH/g (DBz=1.85). The reaction product is then reacted at 60° to 70° C. with 564 g BMI (70%) to an NCO-value of practically 0 (DBz=1.40, BNz=0.84).

(A6) 740 g of a diepoxy compound based on Bisphenol A having an epoxy equivalent of about 185 are reacted at 100° to 170° C. with 102 g 3-dimethylaminopropylamine and 560 g dehydrated castor oil fatty acid, and diluted with 600 g AEGLAC. The reaction product is then reacted at 60° to 70° C. with 866 g UMI (70%) to an NCO-value of practically 0 (DBz=0.99, BNz=0.99). (A7) 485 g dimethylterephthalate and 555 g neopentylglycol are reacted at 160° to 200° C. until the theoretical quantity of methanol is distilled off. After addition of 645 g adipic acid the batch is reacted at 160° to 190° C. to an acid value of 131 mg KOH/g and the polyester is further reacted with 401 g of trishydroxymethylaminomethane to an acid value of below 1 mg KOH/g. The reaction product, diluted to 70% with AEGLAC, has a hydroxyl number of 224 mg KOH/g. 1430 g of the 70% solution are reacted to an NCO-value of practically 0, at 60° to 70° C., with 564 g BMI (70%) and 652 g UMI (70%) (DBz=0.81, BNz=0.81).

(A8) 1000 g of a polybutadiene-maleic anhydride adduct having an MA-equivalent of about 500 are dissolved in 705 g MIBK and reacted with 260 g hydroxyethylmethacrylate at 90° to 105° C. in the presence of 0.2 g hydroquinone and, subsequently with 284 g glycidylmethacrylate to an acid value of below 10 mg KOH/g (DBz=2.6). Thereafter, 109.5 g diethylamine are added to the reaction product and completely reacted at 50° to 80° C. (DBz=1.51, BNz=0.91). The polybutadiene employed is a liquid polybutadiene with 60 to 70% being of cis-configuration.

(B) Preparation of Self-Crosslinking Products Without Basic Characteristics.

(B1) Analogous to (A1) 1000 g of an epoxy resin based on Bisphenol A having an epoxy equivalent of about 500 are dissolved in 492 g AEGLAC and, upon addition of 0.2 g hydroquinone, are reacted with 144 g acrylic acid, at 100° to 110° C., until an acid value of below 5 mg KOH/g is reached (DBz=1.75).

(B2) 520 g of an epoxy resin based on Bisphenol A having an epoxy equivalent of about 260 are dissolved in 465 g AEGLAC and reacted as in (B1) with 564 g of a semiester of tetrahydrophthalic anhydride and hydroxyethylmethacrylate (DBz=1.85).

(B3) 360 g of an epoxy resin based on Bisphenol A having an epoxy equivalent of from 175 to 182 are reacted at 100° to 110° C. in the presence of 0.2 g hydroquinone with 144 g acrylic acid to an acid value of below 3 mg KOH/g and diluted with AEGLAC to 80% (DBz=3.97).

(B4) 1000 g of a styrol-maleic anhydride copolymer having an MA-equivalent of from about 330 to 335 are dissolved in 775 g MIBK and, in the presence of 0.2 g hydroquinone, are reacted at 90° to 120° C. with 390 g hydroxy ethylmethacrylate and 425 g of glycidyl methacrylate to an acid value of below 10 mg KOH/g (DBz=3.3).

(B5) A copolymer is prepared in known manner from 180 g acrylic acid, 120 g ethyl acrylate, 250 g methylacrylate, 250 g n-butylacrylate and 250 g styrol, in 695 g AEGLAC, in the presence of 20 g each of azobisisobutyronitrile and tertiary dodecylmercaptan. The product is further reacted with 355 g of glycidyl methacrylate at 105° to 110° C., with the addition of 0.2 g hydroquinone to an acid value of below 5 mg KOH/g (DBz=1.85).

(B6) 390 g hexamethoxymethylmelamine and 390 g hydroxyethylmethacrylate are reacted at 80° to 100° C. in the presence of 0.8 g hydroquinone and 0.6 g p-toluolsulfonic acid until the theoretical quantity of methanol calculated according to the re-etherification reaction has distilled off. The product is diluted with MIBK to a solids content of 80% (DBz=3.85).

(B7) 1430 g of the 70% solution of the hydroxy groups containing polyester of (A7) are reacted with 1300 g UMI (70%) at from about 60° to 70° C. until an NCO-value of practically 0 is attained (DBz=1.57).

(B8) 1000 g of a polybutadiene-maleic anhydride adduct as in (A8) having an MA-equivalent of about 500 are dissolved in 705 g MIBK and reacted at 90° to 105° C. in the presence of 0.2 g hydroquinone with 260 g hydroxyethylmethacrylate, and thereafter with 284 g glycidylmethacrylate until an acid value of below 10 mg KOH/g is reacted (DBz=2.6).

(C) Preparation of Basic Products Without Sufficient Hardening Capacity.

(C1) To a solution of 1000 g of an epoxy resin based on Bisphenol A having an epoxy equivalent of about 500 in 520 g AEGLAC, 210 g diethanolamine are added dropwise within an hour at from about 100° to 110° C.

Thereafter the batch is heated to 150° C. and reacted for another hour (DBz=1.65).

(C2) A copolymer is prepared in known manner from 250 g n-butylacrylate, 250 g methylmethacrylate, 284 g glycidylmethacrylate, and 216 g styrol, in 695 g AEGLAC in the presence of 20 g each of azobisisobutyronitrile and tertiary dodecylmercaptan. The copolymer is reacted with 210 g diethanolamine at 100° to 105° C. (BNz=1.60).

(C3) 740 L g of a diepoxide based on Bisphenol A having an epoxy equivalent of about 185 are reacted with 102 g 3-dimethylaminopropylamine and 560 g dehydrated castor oil fatty acid, at 100° to 170° C. and diluted with 600 g AEGLAC (BNz=1.42).

(C4) 1430 g of the 70% solution of the hydroxy groups containing polyester of (A7) are reacted with 750 g BMI (70%) to an NCO-value of practically 0 (BNz=1.31).

(C5) A copolymer is prepared in known manner from 290 g hydroxyethylacrylate, 250 g n-butylacrylate, 250 g methylmethacrylate, 110 g ethylacrylate, and 100 g styrol in 708 g AEGLAC and in the presence of 30 g each of azobisisobutyronitrile and tert.dodecylmercaptan. The copolymer is reacted with 542 g BMI (70%) at 60° to 70° C. to an NCO-value of practically 0 (BNz=1.05).

(D) Preparation of the Urethane Compounds 1 mole of a polyisocyanate is charged, diluted with an isocyanate inert solvent such that the final product has a concentration of 60% and, with stirring and preventing access of moisture, the isocyanate equivalent quantity of the isocyanate-reactive compounds is added within one hour at from about 20° to 60° C. Thereafter the batch is stirred at 60° to 100° C. until an NCO-value of below 1 is reached, optionally coemploying polymerization inhibitors. The urethane compounds are defined in Table 2. The heretofore keys apply. MW is molecular weight.

before described. The temperature is optionally raised to 70° C. Weight ratios are listed in Table 3.

TABLE 3

(Composition of Examples 1-29)

| Example No. | 100 Parts Starting Product | | | Parts Urethane Compound |
|---|---|---|---|---|
| | A | B | C | D |
| 1 | A 1 | — | — | 0.5 D 1 (x) |
| 2 | A 2 | — | — | 2.0 D 2 (x) |
| 3 | A 3 | — | — | 2.5 D 1 (x) |
| 4 | A 4 | — | — | 3.5 D 4 (x) |
| 5 | A 5 | — | — | 3.0 D 3 (x) |
| 6 | A 6 | — | — | 5.0 D 5 |
| 7 | A 7 | — | — | 5.0 D 5 |
| 8 | A 8 | — | — | 10.0 D 5 |
| 9 | — | B 1 | — | 200 D 5 |
| 10 | — | B 2 | — | 400 D 6 |
| 11 | — | B 3 | — | 300 D 3 |
| 12 | — | B 4 | — | 250 D 3 |
| 13 | — | B 5 | — | 300 D 7 |
| 14 | — | B 6 | — | 200 D 5 |
| 15 | — | B 7 | — | 100 D 1 |
| 16 | — | B 8 | — | 100 D 3 |
| 17 | — | — | C 1 | 100 D 5 |
| 18 | — | — | C 1 | 50 D 5 |
| 19 | — | — | C 2 | 200 D 7 |
| 20 | — | — | C 3 | 100 D 8 |
| 21 | — | — | C 4 | 100 D 9 |
| 22 | — | — | C 5 | 100 D 9 |
| 23 | — | B 1 | — | 200 D 10 |
| 24 | — | B 1 | C 1 | 100 D 5 |
| 25 | — | B 6 | C 4 | 50 D 7 |
| 26 | — | B 6 | C 1 | 100 D 7 |
| 27 | — | B 1 | C 1 | 100 D 11 |
| 28 | — | B 1 | C 1 | 100 D 12 |
| 29 | — | B 1 | C 1 | 50 D 13 |

(x) In these cases the urethane compounds (D) can be admixed to the finished diluted electrodeposition paint as a paint additive to adjust leveling, adhesion, pH-value, and conductivity.

Evaluation of the Binders According to Examples 1-29

Of the listed binders each 100 g resin solids samples were mixed with the pertinent acid of Table 4 and made

TABLE 2

(Urethane Compounds D1-D13)

| | 1 Mol Poly isocyanate | Solvent | Mols Amino Compound | Mols Hydroxyl Compound | MW | BNz | DBZ |
|---|---|---|---|---|---|---|---|
| D1 | TDI | AEGLAC DMF (1:1) | 1 DMAEA | 1 HAEMA | 393 | 2.55 | 2.55 |
| D2 | TDI | AEGLAC | 1 DMAEA | 1 TPGMMA | 613 | 1.64 | 1.64 |
| D3 | TDI | AEGLAC | 1 DMAEA | 0.5 TPGMMA 0.5 OLA | 572 | 1.9 | 0.88 |
| D4 | IPDI | DMF | 1 DMPA | 1 HAEMA | 455 | 2.1 | 2:1 |
| D5 | TDI | AEGLAC DMF (1:1) | 1 DMAEA | 1 TMPDMA | 533 | 1.87 | 3.75 |
| D6 | TPMT | AEGLAC DMF (1:1) | 1 DMAEA | 1 TMPDMA | 992 | 1.01 | 2.02 |
| D7 | TPMT | AEGLAC DMF (1:1) | 1 DMPA | 1 TPGMMA | 850 | 1.17 | 2.35 |
| D8 | TIPTP | AEGLAC DMF (1:1) | 1 DMAEA | 1 HAEMA 1 TMPDMA | 954 | 1.05 | 3.15 |
| D9 | TIPTP | AEGLAC DMF (1:1) | 1 DMAEA | 2 TMPDMA | 1094 | 0.91 | 3.65 |
| D10 | TPMT | DMF | 2 DMAEA | 1 TMPDMA | 815 | 2.46 | 2.46 |
| D11 | TPMT | AEGLAC DMF (1:1) | 1 DMAEA | 1 TMPDMA 1 STAL | 997 | 1.0 | 2.0 |
| D12 | TPMT | DMF | 1 DMAEA | 1 TMPDMA 1 OLS | 969 | 1.03 | 2.06 |
| D13 | TPMT | DMF | 1 DMAEA | 1 TMPDMA 1 INS | 856 | 1.17 | 2.34 |

EXAMPLES 1-29:

100 parts (resin solids) of product (A), (B), (C) as hereinbefore described are thoroughly mixed with the listed quantities of urethane compounds (D) as hereinbefore described are thoroughly mixed with the listed quantities of urethane compounds (D) as herein- up to 1000 g with deionized water while stirring. The 10% solution was deposited cathodically on steel. Deposition time in all cases was 60 seconds. The coated substrates were then rinsed with deionized water and cured at elevated temperature. The resulting films had a film thickness of 13 to 17 μm. The results are listed in Table 4.

TABLE 4

| | (Evaluation of Coatings) | | | | | | | |
|---|---|---|---|---|---|---|---|---|
| | Neutralization | | | Deposition | | Test for | | |
| | Quantity | Type | pH | | Cure | Hardness | Indentation | Resistance |
| Example | (1) | (2) | (3) | Volt | Min/°C. | (4) | (5) | (6) | (7) |
| 1 | 3.2 | E | 6.6 | 240 | 20/170 | 190 | 7.8 | 480 | 360 |
| 2 | 4.8 | M | 6.5 | 260 | 20/180 | 185 | 8.2 | 460 | 300 |
| 3 | 3.0 | E | 6.7 | 230 | 25/180 | 170 | 8.5 | 360 | 240 |
| 4 | 5.5 | M | 6.2 | 220 | 25/180 | 190 | 8.0 | 440 | 320 |
| 5 | 3.5 | E | 6.4 | 250 | 25/180 | 165 | 8.2 | 360 | 240 |
| 6 | 6.0 | M | 6.0 | 200 | 25/180 | 170 | 8.0 | 340 | 220 |
| 7 | 6.0 | M | 5.9 | 210 | 25/180 | 160 | 8.5 | 340 | 200 |
| 8 | 4.5 | E | 6.2 | 190 | 20/180 | 160 | 8.5 | 340 | 240 |
| 9 | 3.2 | E | 6.1 | 170 | 15/170 | 180 | 7.0 | 360 | 240 |
| 10 | 3.5 | E | 6.3 | 170 | 20/180 | 160 | 7.5 | 320 | 200 |
| 11 | 3.2 | E | 6.4 | 160 | 20/170 | 155 | 8.0 | 320 | 220 |
| 12 | 3.2 | E | 6.2 | 160 | 20/170 | 150 | 7.9 | 340 | 240 |
| 13 | 3.0 | E | 6.1 | 180 | 25/180 | 160 | 8.2 | 360 | 240 |
| 14 | 1.2 | P | 5.5 | 170 | 15/180 | 190 | 7.0 | 440 | 360 |
| 15 | 3.0 | M | 5.9 | 170 | 25/180 | 170 | 7.2 | 360 | 240 |
| 16 | 3.0 | M | 5.7 | 160 | 20/180 | 160 | 7.7 | 320 | 200 |
| 17 | 6.0 | M | 6.2 | 180 | 25/180 | 170 | 7.5 | 360 | 240 |
| 18 | 5.0 | M | 6.1 | 190 | 25/180 | 170 | 7.8 | 300 | 180 |
| 19 | 4.0 | E | 6.4 | 200 | 15/180 | 150 | 8.0 | 360 | 240 |
| 20 | 5.5 | M | 6.0 | 180 | 20/180 | 160 | 8.0 | 380 | 240 |
| 21 | 4.0 | E | 6.3 | 170 | 20/180 | 180 | 7.0 | 360 | 200 |
| 22 | 4.0 | E | 6.1 | 190 | 25/180 | 180 | 7.2 | 360 | 240 |
| 23 | 3.0 | E | 6.5 | 180 | 20/170 | 180 | 7.5 | 420 | 280 |
| 24 | 3.5 | E | 6.2 | 170 | 20/180 | 170 | 7.0 | 320 | 220 |
| 25 | 4.5 | M | 6.0 | 160 | 25/180 | 190 | 8.5 | 320 | 180 |
| 26 | 4.2 | M | 6.1 | 160 | 25/180 | 190 | 6.9 | 280 | 200 |
| 27 | 3.5 | E | 5.9 | 180 | 25/180 | 150 | 7.5 | 250 | 180 |
| 28 | 4.9 | M | 5.8 | 170 | 20/180 | 160 | 7.0 | 340 | 240 |
| 29 | 5.0 | M | 5.6 | 160 | 25/180 | 160 | 5.2 | 240 | 120 |

Key to Table 4
(1) quantity of acid in g added to 100 g of resin solids
(2) E = acetic acid, M = lactic acid, P = phosphoric acid
(3) measured on a 10% solution
(4) Konig pendulum hardness DIN 53 157 (sec)
(5) Erichsen indentation DIN 53 156 (mm)
(6) hours of water soak at 40° C. until corrosion or blistering become visible
(7) salt spray resistance ASTM B 117-64 - 2 mm corrosion at cross-incision after the listed number of hours For this test clean untreated steel panels were coated with a pigmented paint consisting of 100 parts by weight resin solids, 20 parts by weight of aluminum silicate pigment, and 2 parts by weight of carbon black.

In the above illustrative examples various modifications can be made falling within the scope of the claimed invention. Such modifications being within the ability of one skilled in the art are within the scope of the present invention.

It is claimed:
1. Emulsions of binders which are cathodically depositable in an electrodeposition system comprising (A) 10 to 99.9 percent by weight of at least one self-crosslinking polymeric resin, and (B) 0.1 to 90 percent by weight of at least one basic urethane compound having the formula

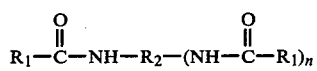

wherein n is an integer of 1, 2, or 3; R is an aromatic, cycloaliphatic, or aliphatic hydrocarbon radical; $R_1$ is the moiety of a dialkylalkanolamine remaining after reaction with an isocyanate, and $R_2$ is the moiety of at least one member of the group consisting of monohydroxyalkyl(meth)acrylate, monohydroxyalkoxy(meth)acrylate, and a monohydroxyallylether of a polyol after reaction with an isocyanate; the components (A) and (B) being selected to provide an emulsion having a basicity corresponding to at least 0.5 and a double bond number of at least 0.5.

2. The emulsion of claim 1 wherein in said self-crosslinking resin is a polyaddition resin.

3. The emulsion of claim 1 wherein the basicity content is derived from basic nitrogen atoms.

4. The emulsion of claim 3 wherein the basicity content is from 0.8 to 2.5.

5. The emulsion of claim 1 wherein $R_2$ is in part the moiety of a fatty alcohol with from 1 to 24 carbon atoms.

6. The emulsion of claim 5 wherein the alcohol has at least 6 carbon atoms and is unsaturated.

7. The emulsion of claim 1 wherein $R_2$ is in part the moiety of an unsaturated fatty acid of from 1 to 24 carbon atoms.

8. The emulsion of claim 7 wherein the monocarboxylic acid has at least 6 carbon atoms and is unsaturated.

9. The emulsion of claim 1 wherein component (A) is present in the amount of from 95 to 99.5 percent by weight and includes at least 0.5 basic nitrogen atoms per 1000 molecular weight units and a double bond number of at least 0.5, and wherein component (B) is present in an amount of from about 6.5 to 5 percent.

10. The emulsion of claim 1 wherein component (A) is present in an amount of from 20 to 80 percent by weight and has a double bond number of at least 0.5 and no basic nitrogen groups; and component (B) is present in an amount of from 80 to 20 percent by weight and includes a basic nitrogen content of 0.8 to 1.5 and a double bond number of at least 0.5.

11. The emulsion of claim 1 wherein component (A) is present in an amount of 20 to 80 percent by weight, has a double bond number of at least 0.5, and at least 0.8 to 2.5 basic nitrogen groups; and component (B) is present in an amount of from 80 to 20 percent by weight.

12. The process of providing a coating composition which will cathodically deposit when used in an electrodeposition process comprising the steps of (1) providing an emulsion of (A) 10 to 99.9 percent weight of at least one self-crosslinking polymeric resin; and (B) 0.1 to 90 percent by weight of at least one basic urethane compound having the formula

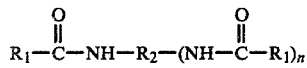

wherein n is an integer of 1, 2, or 3; R is an aromatic, cycloaliphatic, or aliphatic hydrocarbon radical; $R_1$ is the moiety of a dialkylalkanolamine remaining after reaction with an isocyanate, and $R_2$ is the moiety of at least one member of the group consisting of monohydroxyalkyl(meth)acrylate, monohydroxyalkoxy(meth)acrylate, and a monohydroxyallylether of a polyol after reaction with an isocyanate; and (2) neutralizing said reaction product with an organic or inorganic acid, and components (A) and (B) being selected to provide a final emulsion having a basicity corresponding to at least 0.5 and a double bond number of at least 0.5.

13. The emulsion of claim 1 wherein said self-crosslinking resin is a polycondensation resin.

14. The process of claim 12 wherein said self-crosslinking resin is a polycondensation resin.

* * * * *